May 25, 1937. A. L. MURRAY Re. 20,381

RUBBER HEEL PATCHING LIFT

Original Filed Dec. 9, 1933

INVENTOR.
ALBERT L. MURRAY.

BY
Lakewood, Lakewood Goldsmith & Galt

ATTORNEYS.

Reissued May 25, 1937

Re. 20,381

UNITED STATES PATENT OFFICE 20,381

RUBBER HEEL PATCHING LIFT

Albert L. Murray, Auburn, Ind.

Original No. 2,012,173, dated August 20, 1935, Serial No. 701,660, December 9, 1933. Application for reissue April 23, 1936, Serial No. 76,074

6 Claims. (Cl. 36—35)

This invention relates to a heel lift construction suitable for repairing worn heels. Worn heels may be either of leather or of rubber. Usually the worn heel is rounded at the back and rounded upwardly. The present practice is to remove the old rubber heel and apply an entirely new heel, or in the case of repairing leather heels with leather, remove the two outermost lifts and then apply new lifts thereto in the usual manner. In each instance, however, if the wear at the back in rounding the heel is of such an extreme character, it may be necessary to square-up the surface of the heel by the addition of a wedge or equivalent insert.

The present invention is directed to a heel lift of rubber that may be applied to a worn rubber heel or to a worn leather heel and which can be applied thereto so as to automatically compensate for the rounding wear thereof.

Inasmuch as a lift of this character is relatively thin compared to the standard rubber heel but is a little more than the thickness of the standard rubber lift that is approximately ⅛″ in thickness, it is quite apparent that in order to prevent drying out of the repairing rubber heel lift so that the rubber lift may be readily cemented to the worn heel, it may be highly desirable to protect the face of the lift that is to be cemented to the heel to prevent the loss of a tacky surface, if it is provided with a tacky surface in its initial manufacture and such protection is obtained by the use of a protecting covering in the form of a "holland" sheet or a paper strip of an equivalent character.

In the formation of the lift, when paper of this character is used, it is understood that the lift is made from a blank cut from sheet material of substantially uniform thickness as it comes from the calender rolls and these blanks are placed in molds to which has been applied the protective covering, such as "holland" and the like. Then when a paper covering is utilized, it is practically necessary that the paper all lie in one plane. Otherwise, due to the application of pressure and heat in the formation of the lift in the molding process, the paper will crack if it is deformed from that predetermined plane.

The present invention, therefore, permits the formation of a repairing heel lift in a commercial production manner and that will permit one face of the heel lift to be protected by a "holland", and the like, until the purchaser or ultimate consumer desires to apply the lift to the worn heel. This the purchaser does by suitably roughening the surface of the worn heel, whether it be leather or rubber and applying rubber cement to said roughened surface and also by applying rubber cement to the surface protected by the "holland" whenever that is used, and the two rubber cemented surfaces are permitted to dry until they become quite tacky and are then united together under hand pressure, thus permanently securing the lift to the worn-out heel.

The present invention also has another desirable advantage and that is that by reason of its particular conformation, it is not necessary that there be provided for each size of heel now used in the shoe industry, a repairing heel lift of that size.

It has been determined that heels from 1 to 4 of the boys' size may be accommodated by a heel lift embodying the present invention that is just large enough for the #1 size. In other words, the range of accommodation is such that the #2, 3 and 4 sizes of lifts need not be manufactured, but the #1 lift may be applied to heels of this size. Likewise, for use on young men's and men's shoes, the heel lift made to be applied to the #5 size of shoe will also accommodate #6, 7 and 8. Also, the #9 size heel lift will accommodate the heels of shoes #10, 11 and 12, while the #13 size, for example, will accommodate not only the #13 size shoe heel but also the #14 and 15 as well.

The aforesaid invention, therefore, reduces the number of sizes the manufacturer of heel lifts has to make and the number of sizes that the retailer has to stock. The aforesaid advantage is obtained by reason of the so-called tapered edge of the heel.

Another advantage obtained commercially as a result of the form of this heel lift, is that, as before stated, the lift is molded from a blank of substantially uniform thickness that comes from the calender and by reason of the tapered edges on the completed lift and whenever desirable or necessary by reason of the central depression formed, the excess stock in the blank is caused to flow in the molding process so as to be localized at a particular point in the completed heel lift.

This localized material or collected material is available for compensating for the excessively worn or curved portion of the worn heel and thus the requirement that an additional wedge or lift wedge be employed is eliminated.

Another, and the chief advantage of the present invention by reason of its form, is that when the lift is cemented to the heel, due to the particular conformation or rather the two angles that form a ridge where the excess material is collected, the ridge is so positioned with relation to the extreme rear edge that the lift, at that edge adjacent its enlargement, is readily deformable so as to conform readily to the worn portion of the heel, thereby permitting the heel lift to be secured upon its entire tacky surface to substantially the entire surface of the worn heel and thus prevents the formation of any gap between the lift and the heel, at its original worn portion, which is usually at the back of the heel.

The full nature of the invention will be understood from the accompanying drawing and the following description and claims:

In the drawing, Fig. 1 is a top plan view of the exposed or wearing face of the repairing heel lift.

Figure 2:
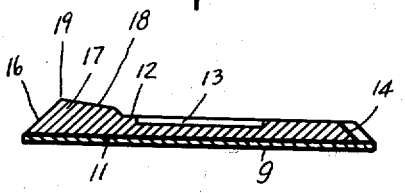
Fig. 2 is a longitudinal sectional view of the protected heel previous to its application for repair purposes.
Figure 3:
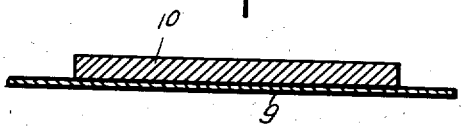
Fig. 3 is a longitudinal sectional view through the blank and protector from which the protected heel lift is made.

In Fig. 3 of the drawing, 10 indicates a blank of the desired thickness and desired outline, which is herein shown with the "holland" 9, or the like, being applied thereto. This blank is placed in the mold and subjected to heat and pressure which causes the rubber material to flow into the desired conformation resulting in the heel lift shown in Figs. 1, 2 and 4. In said figures, 11 indicates a flat face that may or may not be provided with a tacky surface and if it is provided with a tacky surface, the same is usually covered or protected by a "holland" or the like 9. The opposite face 12 is shown provided with a recess 13 that is herein shown circular in form, although it may be of any desired shape and said recess is provided for two purposes—one, the so-called suction effect when used on a heel for preventing slipping when the heel is applied to a wet or slick surface upon which the wearer of the shoe is standing or walking, and second, for providing stock for the thickened portion of the lift.

Figure 1:
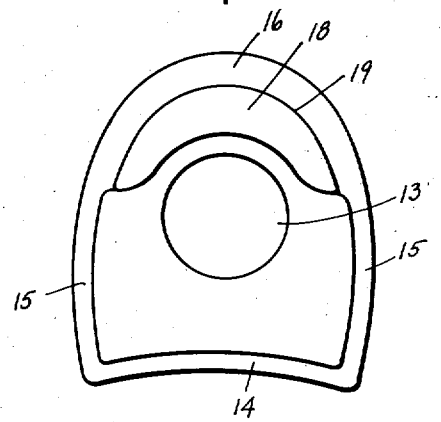
Figure 4:
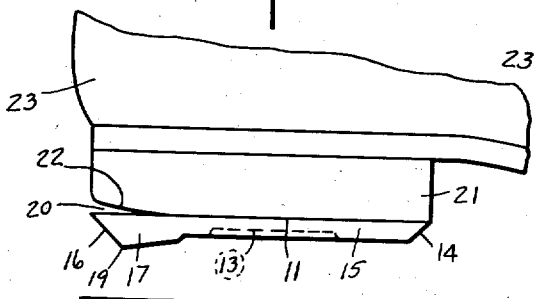
Fig. 4 is a side elevational view of a portion of a shoe having a worn heel with the repairing heel lift positioned adjacent thereto immediately previous to securing the two together.

As shown in Figs. 1, 2 and 4, the forward edge of the heel is beveled as at 14 and also the two opposite sides are beveled as at 15. The rear edge of the heel is also beveled as at 16 and the surplus material, as hereinbefore set forth, which is obtained by reason of the beveling and the depression or recess 13, if utilized in the mold process, is caused to flow to the rear end of the heel lift, resulting in the enlargement 17 having the bevel face 16, before mentioned, which is continued to the end of the enlargement and said enlargement has the inclined face 18, the two having a certain angular relationship that terminates as at 19, remote from the back edge of the lift.

In Fig. 1 the enlargement is shown symmetrically arranged relative to the longitudinal axis of the heel lift. When thus formed, a pair of identical lifts may be utilized for repair purposes on a pair of shoes. However, whenever desired, the enlargement 18 need not be symmetrically arranged but can be arranged upon one side or the other. In that event, two different lifts will be required for the repair of a pair of shoes—one a right hand lift and the other a left hand lift.

As previously set forth, a heel lift of this character has the flat face 11 which preferably is of tacky character and that tackiness is preserved from the time it leaves the manufacturer until the heel lift is used by the purchaser by the addition of a "holland" or the like 9. As previously set forth, also, when a paper protective covering, equivalent to a "holland", is utilized, it is quite apparent that in the molding process that if the paper does not lie in a common plane, it will crease, score or fracture by reason of the heat and pressure applied thereto, and consequently, the present invention contemplates the formation of the face 11, especially when protected, in a single plane.

The critical feature of the heel lift disclosed herein, is the angular relationship between the beveling 16 and the face 18, resulting in the mergence thereof, as at 19. This positions the enlargement inwardly of the extreme back edge of the lift and thereby leaves the extreme back edge of the lift relatively flexible for the purpose previously set forth briefly, and now set forth in detail.

In Fig. 4, it will be observed the heel lift when it has had its "holland" removed and the surface of the worn heel is cemented and the surface of the heel lift is cemented, and the two are placed together, that a certain gap 20 will exist between the heel lift and the heel 21 worn away or rounded as at 22, said heel being a part of the shoe 23. Immediately following placing the heel lift upon the worn heel, as shown in Fig. 4, finger pressure is applied thereto and that forces the reduced portion 24 of the enlargement into contact with the worn portion 22 of the heel and thus, eliminates the gap therebetween so that the heel lift throughout its entire surface, represented by the face 11, is suitably and adhesively secured to the exposed and worn face of the heel of the shoe. It has been determined that it is this reduction as at 24 associated with the enlargement 17 that permits a heel lift of this character to be satisfactorily applied to a worn and rounded heel and capable of being secured adhesively thereto and retained by that cement union. It has been observed that without the reduction 24, the enlargement would be so stiff or resistant to this deformation, resulting from the change of position, characterized by Figs. 4 and 5, that a cement union would not hold the same during subsequent use.

With the present invention, however, a cement union has been found sufficient and satisfactory for adhesively securing the entire heel lift throughout its tacky surface to the surface of the worn heel. In other words, this conformation or arrangement permits of the flexing of the rear portion of the heel lift and without any undue resistance thereto, so that the cement union can hold that portion of the lift in contact with the worn portion of the heel.

Figure 5:
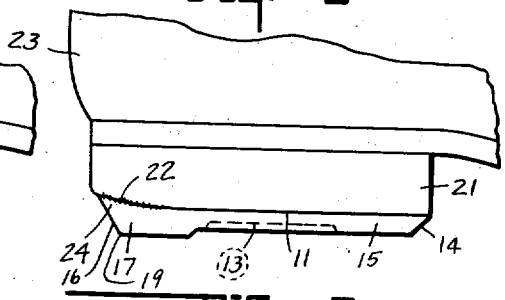
Fig. 5 is a similar view of the shoe heel and lift embodying the invention in its secured position upon the worn heel.

It has also been determined that when the heel has been repaired, as illustrated in Fig. 5, that the slight inward and forward inclination of the edge of the heel is not apparent to others when the shoe is worn and naturally such difference has no structural disadvantage in the use of the shoe.

It has been determined the material utilized to form the heel lift may be of relatively flexible character and preferably has a raw gum or tacky face.

While the blank shown in Fig. 10 is illustrated as being of homogeneous character throughout, that blank, however, may be made of two or more layers of material homogeneously secured together.

Figure 6:
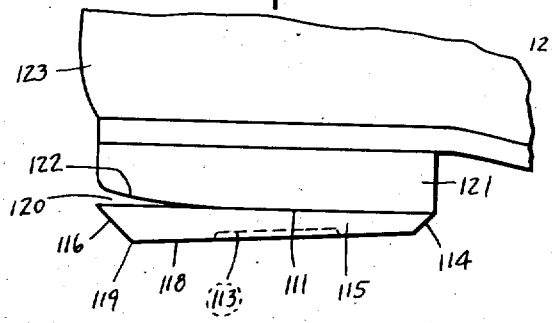
Fig. 6 is a view similar to Fig. 4 and of a modified form of heel lift.
Figure 7:
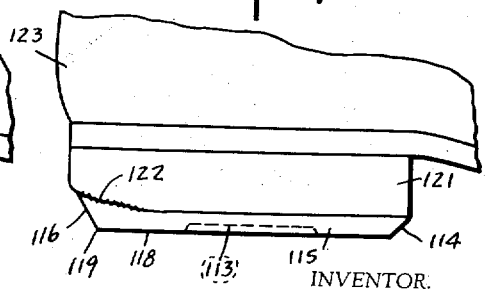
Fig. 7 is a view similar to Fig. 5 and of the modified form of the invention shown in Fig. 6.

In Figs. 6 and 7 there is illustrated a simplified form of the invention and in said figures, 123 indicates a shoe having the heel 121 worn as at 122. The heel lift has the flat face 111 that when first positioned adjacent the worn heel leaves the gap 120 at the rounded or extremely worn portion. The heel lift, in this form of the invention, has a forward beveled face 114, the two beveled side faces 115 and the rearward beveled edge 116 and herein, the face 118 merging with the beveled rear edge 116 as at 119, is shown continued from the back to the front of the heel lift. If desired, this heel lift may be provided with the central depression, as shown dotted in Fig. 6 as at 113.

While the invention has been set forth in detail hereinbefore, it is to be understood that the gist of the invention consists in the commercial production of a heel lift for repairing worn heels that does not require the use of a wedge insert, or the like, at the extremely worn portion and which heel lift is so arranged that one face thereof lies in substantially a single plane permitting the use of a paper or "holland" protector, and which is capable of flexing adjacent the thickened portion utilized for filling in the gap resulting from extreme localized heel wear and without the introduction of undue resistance to such flexing which would result in the heel lift being incapable of being secured to the heel through a cement union and retained in united relation by such a union during the wearing of the shoe after the repair has been made.

Several modifications have been set forth hereinbefore and these modifications and the specific description are to be considered illustrative in character. These modifications also, as well as others which will readily suggest themselves to persons skilled in this art, are all considered to be within the broad scope of this invention, reference being had to the appended claims.

The invention claimed is:

1. A cement-on heel lift suitable for repair purposes, including a main body portion having a conventional heel outline and a substantially plane face of rubber which is receptive to rubber cement and for heel contact, said body portion upon the tread side and near the rear thereof and spaced from the end having a thickened portion, the latter having a long bevel face directed toward the plane face and to the rear of the lift and terminating substantially at the rear of the lift for the purpose set forth, the other edges of the body being beveled and terminating substantially at the plane face with the greatest area of the lift coincident with the plane face.

2. A cement-on heel lift suitable for repair purposes, including a main body portion having a conventional heel outline and a substantially plane face of rubber which is receptive to rubber cement and for heel contact, said body portion upon the tread side and near the rear thereof and spaced from the end having a thickened portion, the latter having a long bevel face directed toward the plane face and to the rear of the lift and terminating substantially at the rear of the lift for the purpose set forth, said thickened portion having an oppositely directed and inclined face, the other edges of the body being beveled and terminating substantially at the plane face with the greatest area of the lift coincident with the plane face.

3. A cement-on heel lift suitable for repair purposes, including a main body portion having a conventional heel outline and a substantially plane face of rubber which is receptive to rubber cement and for heel contact, said body portion upon the tread side and near the rear thereof and spaced from the end having a thickened portion, the latter having a long bevel face directed toward the plane face and to the rear of the lift and terminating substantially at the rear of the lift for the purpose set forth, said thickened portion having an oppositely directed and inclined face terminating an appreciable distance from the front of the lift, the other edges of the body being beveled and terminating substantially at the plane face with the greatest area of the lift coincident with the plane face.

4. A relatively universally adaptable cement-on heel lift structure suitable for worn heel repair purposes, including a main body portion having a conventional heel outline and a substantially plane face of tacky rubber which is receptive to rubber cement and for heel contact, and a flat protective sheet on said face for tackiness preservation until heel application, said body portion, upon the tread side and near the rear end thereof, but spaced from the said end, having its thickest portion, the latter having a relatively long but steep bevel face directed toward the plane face and the rear end of the lift and terminating substantially at the rear end of the lift insuring relatively permanent cementitious union of the heel and lift throughout their registering area and at the point of greatest wear and strain therein respectively.

5. A relatively universally adaptable cement-on heel lift structure suitable for worn heel repair purposes, including a main body portion having a conventional heel outline and a substantially plane face of tacky rubber which is receptive to rubber cement and for heel contact, and a flat protective sheet on said face for tackiness preservation until heel application, said body portion, upon the tread side and near the rear end thereof, but spaced from the said end, having its thickest portion, the latter having a relatively long but steep bevel face directed toward the plane face and the rear end of the lift and terminating substantially at the rear end of the lift insuring relatively permanent cementitious union of the heel and lift throughout their registering area and at the point of greatest wear and strain therein respectively, said thickened portion having an oppositely directed and inclined face.

6. A cement-on rubber element suitable for shoe and the like repair purposes, including a main body portion having a conventional outline conforming to the bottom portion of the shoe to be repaired, and a substantially plane face of rubber which is receptive to rubber cement and for shoe bottom contact, said body portion upon the tread surface thereof having a localized portion of greater thickness than the remainder of the body located inwardly from one end of the body portion, the said body portion having a relatively long bevel face connecting the said end with the said thickened portion at the area of the greatest thickness thereof.

ALBERT L. MURRAY.